(12) United States Patent
Maturana et al.

(10) Patent No.: US 11,676,055 B2
(45) Date of Patent: Jun. 13, 2023

(54) SYSTEM FOR DETECTING DATA DRIFT IN MACHINE-LEARNING PROCESS MONITORING

(71) Applicant: Rockwell Automation Technologies, Inc., Mayfield Heights, OH (US)

(72) Inventors: Francisco P. Maturana, Lyndhurst, OH (US); Gregory J. Vance, Cleveland, OH (US); Mikica Cvijetinovic, Cleveland, OH (US); Braun C. Brennecke, Pittsburgh, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/944,750

(22) Filed: Sep. 14, 2022

(65) Prior Publication Data

US 2023/0020485 A1 Jan. 19, 2023

Related U.S. Application Data

(63) Continuation of application No. 16/679,611, filed on Nov. 11, 2019, now Pat. No. 11,468,353.

(51) Int. Cl.
*G06N 7/01* (2023.01)
*G06T 7/00* (2017.01)
*G06N 20/00* (2019.01)

(52) U.S. Cl.
CPC ............. *G06N 7/01* (2023.01); *G06N 20/00* (2019.01); *G06T 7/0004* (2013.01); *G06T 2207/20081* (2013.01)

(58) Field of Classification Search
None
See application file for complete search history.

(56) References Cited

U.S. PATENT DOCUMENTS

| 8,812,586 | B1 | 8/2014 | Kulkarni et al. |
| 2016/0360336 | A1 | 12/2016 | Gross et al. |
| 2018/0089412 | A1 | 3/2018 | Kpikare et al. |
| 2019/0064004 | A1 | 2/2019 | Brady et al. |
| 2019/0221202 | A1* | 7/2019 | Li ........................ G10L 13/047 |
| 2019/0348041 | A1 | 11/2019 | Celia et al. |
| 2020/0240662 | A1 | 7/2020 | Picardi et al. |
| 2020/0311557 | A1* | 10/2020 | Jin ........................... G06F 18/24 |
| 2020/0393324 | A1 | 12/2020 | Rudd et al. |
| 2021/0142198 | A1* | 5/2021 | Maturana ................. G06N 7/01 |
| 2021/0233190 | A1 | 7/2021 | Aftkhar et al. |
| 2021/0279565 | A1 | 9/2021 | Akella et al. |
| 2022/0150560 | A1* | 5/2022 | Kasal ............... H04N 21/44209 |
| 2022/0222401 | A1* | 7/2022 | Atkins ..................... G06F 30/27 |
| 2022/0245492 | A1* | 8/2022 | Bradley .................. G06N 20/00 |
| 2022/0351055 | A1* | 11/2022 | Anand .................... G06N 20/00 |

* cited by examiner

*Primary Examiner* — Toan H Vu
(74) *Attorney, Agent, or Firm* — Boyle Fredrickson, SC

(57) ABSTRACT

A monitor provides run time monitoring of the input values to a signature analyzer having a machine-learning engine to compare statistics measuring the domain of those input values to the domain of input values used in the training set of the machine-learning engine. This comparison yields an indication of whether retraining of the machine-learning engine is required without analysis of the output of the machine-learning engine algorithm or the need for errors to become manifest.

20 Claims, 4 Drawing Sheets

SYSTEM FOR DETECTING DATA DRIFT IN MACHINE-LEARNING PROCESS MONITORING

CROSS-REFERENCE TO RELATED APPLICATIONS

This application is a continuation of and claims priority to U.S. application Ser. No. 16/679,611, filed Nov. 11, 2019, the entire contents of which is incorporated herein by reference.

BACKGROUND INFORMATION

The present invention relates generally to industrial control systems and in particular to systems for monitoring industrial processes to detect irregularities from nominal data signatures.

Machine or process failures in an industrial environment can be costly in terms of downtime and the need to scrap incorrectly manufactured products. While an aggressive maintenance schedule can sometimes avoid such failure, maintenance is also expensive and can require process downtime. For these reasons, it is desirable to accurately predict imminent machine or process failure so that preventive maintenance can be performed efficiently.

Early techniques to predict machine failure monitored the sound of the operating machine to detect changes in that sound that, for example, indicated early bearing wear or the like. Machine sounds during normal operation were extracted as a "signature" which could be compared to later signatures of the machine to detect signs that suggested preventive maintenance.

This audio signature extraction process was soon extended to more general "digital signatures" that captured a variety of process or machine variables not limited to sound from microphones but including, for example, data from loads-cells, temperature probes, position and pressure sensors, timers, displacement gages, and machine vision data.

The amount of potentially useful data that can be usefully collected in a signature can be difficult to analyze at a human level. Accordingly, machine-learning techniques have been applied to this signature analysis problem. Such machine-learning may use a "supervised machine-learning process" where data signatures are collected from a machine or process and linked to categories of proper or improper machine or process operations. These signatures and categories form a teaching set which is used to train internal weights of a machine-learning engine. The resulting trained machine-learning engine can often detect extremely subtle changes in a process or machine, imperceptible or unintelligible to human observers, that can accurately predict the need for preventive maintenance. In some cases, this information can be used in a real time control setting, for example, in culling workpieces early in a process for rework or scrapping when it is predicted that these workpieces will ultimately not produce viable product. In this way, wasted investment in downstream processes and materials can be avoided.

For example, a printed circuit board fabrication line may include an early station which applies solder paste to a printed circuit board for later receipt of parts that will be flow soldered to the printed circuit board. Early detection of the misapplication of solder paste through a machine-learning engine, can permit the culling of boards with misapplication of solder paste for reworking before parts are assembled to those boards which would be ultimately wasted. The time between solder paste application and the completion and testing of the finished product can be on the order of days/weeks thus making early detection through machine-learning valuable.

Properly operating industrial processes slowly change over the manufacturing lifecycle, for example, when there are changes in the constituent materials used by the manufacturing process, for example, fabricated or obtained from external sources. Such variations can cause a machine-learning engine to fail either by detecting errors that do not exist (false positives) or failing to detect errors that do in fact exist (false negatives). False positive errors are difficult to detect, particularly in the situation where the erroneous boards are culled and thus never tested to confirm failure. False negative errors can be detected in final testing but result in wasted resources and scrapped product; and thus the practical applicability of ML in production.

Regular retraining the machine-learning engine is one solution to this problem of machine-learning engine failure; however, collecting, cleaning, and characterizing data to form a useful training set is complex and expensive. Because the specific operation of the machine-learning engine is not humanly understandable, detecting when a machine-learning engine has failed or is about to fail cannot be done by human inspection of the machine-learning engine itself.

BRIEF DESCRIPTION

In one embodiment, the invention provides a monitor for a signature analyzer, the signature analyzer receiving sensor data from an industrial process to detect anomalies in the industrial process revealed by analysis of the sensor data, where the signature analyzer employs a machine-learning engine trained by a training set of historical sensor data. The monitor includes a set of inputs receiving current sensor data from the industrial process also received by the signature analyzer and a computer memory for holding statistical values characterizing the training set used to train the machine-learning engine. A processor executes a stored program to: (a) analyze the current sensor data to develop at least one current statistical value describing the current sensor data; (b) analyze the training set to develop at least one training statistical value describing the training set; (c) compare the at least one current statistical value to the at least one training statistical value to determine a deviation value between these values; and (d) output an indication that retraining of the machine-learning engine is required based on the deviation value.

It is thus a feature of at least one embodiment of the invention to provide a way of automatically characterizing a need for retraining to avoid both unnecessary and expensive retraining and to avoid delayed retraining such as can risk increase in product scrap and the like.

The processor may further output indications that retraining of the machine-learning engine is not required and alternatively that a need for retraining of the machine-learning engine is imminent. The detected drift in the data can be correlated with known changes in the process to better evaluate the need for retraining and can also be used proactively to identify the occurrences of changes in the process that should be evaluated (thus as a second level of machine monitoring)

It is thus a feature of at least one embodiment of the invention to provide nuanced retraining indication levels allowing a user to anticipate the need for retraining.

The sensor data may include data from load-cells, temperature sensors, position sensors, pressure sensors, timers, microphones, displacement gages, and accelerometers as well as from machine vision systems and the like.

It is thus a feature of at least one embodiment of the invention to provide a monitor suitable for use with standard industrial control data.

The current statistical value may describe a domain of current sensor data received by the machine-learning engine, and the training statistical value may describe a domain of historical sensor data in the training set.

It is thus a feature of at least one embodiment of the invention to determine retraining from the analysis of the data domains of the sensor data and thus to provide a system that can work without understanding the internal operational machine-learning engine.

The training set statistical value may measure a statistical distribution of the training set, and the current statistical value may measure a matching of the current sensor data to the statistical distribution of the training set.

It is thus a feature of at least one embodiment of the invention to allow characterization of the need for retraining against a unified standard defined by the historical training data.

The training set statistical value may be a silhouette indicating how well the sensor values of the training set conform to clusters formed of the sensor values of the training set and current statistical value may be a silhouette indicating how well the sensor values of the current sensor data conform to the clusters formed of the sensor values of the training set with respect to the relative distance centroids that are calculated from the baseline data (training data set).

It is thus a feature of at least one embodiment of the invention to make use of well-characterized techniques of cluster analysis for domain assessment.

The comparison may compare the silhouette associated with the training set and the silhouette associated with the current sensor to provide an indication of need to retrain the machine-learning signature detector based on a percentage difference between these two silhouettes.

It is thus a feature of at least one embodiment of the invention to use a silhouette value to provide automatically scaled domain ranges against which current data can be compared.

In one embodiment the invention can provide an industrial control system providing an input/output interface for communicating with sensors and actuators providing control data for the control of an industrial process and an input interface for communicating with sensors for collecting sensor data for prediction of the operation of the industrial process. The industrial control system may include a processor communicating with computer memory holding: (a) a control program receiving inputs from sensors through the input/output interface to provide outputs to the actuators through the input/output interface to control the industrial process; (b) a signature analyzer receiving sensor data through the input interface and providing a machine-learning engine to detect anomalies in the industrial process revealed analysis of the inputs, the machine-learning engine trained by a training set of historical sensor data; and (c) a monitor operating to monitor the signature analyzer. The monitor may (i) analyze current sensor data from the input interface to develop at least one current statistical value describing the current sensor data; (ii) analyze the training set to develop at least one training statistical value describing the training set; (iii) compare the at least one current statistical value to the at least one training statistical value to determine a deviation value between these values; and (iv) output an indication that retraining of the machine-learning engine is required based on the deviation value.

It is thus a feature of at least one embodiment of the invention to provide an industrial controller that can incorporate a signature analyzer and monitor so as to be able to easily share sensor data and processing resources.

These particular objects and advantages may apply to only some embodiments falling within the claims and thus do not define the scope of the invention. These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
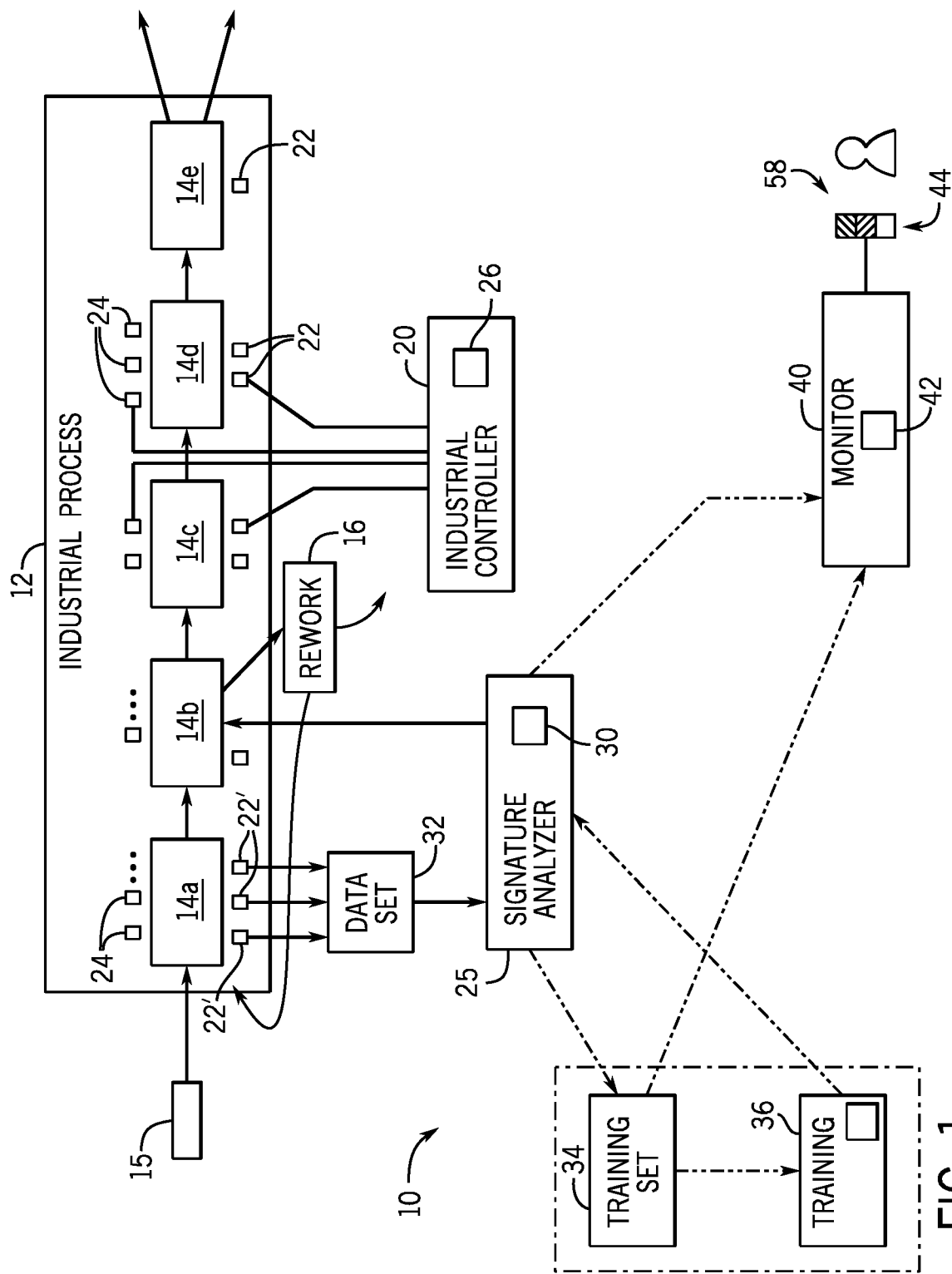
FIG. 1 is a block diagram of an industrial process controlled by an industrial controller as evaluated by a machine-learning based signature analyzer and showing a monitor for determining whether the signature analyzer needs retraining.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a method of monitoring a machine-learning engine used for signature analysis by analyzing the data by the machine-learning engine without inspection of the machine-learning engine itself or waiting for failures to be manifest in the industrial process. At the time of the training of the machine-learning engine, a statistical model of the training set is created and compared to a similar statistical modeling of the data received by the machine-learning engine during operation. A need for retraining is indicated these when statistics are sufficiently different.

Referring now to FIG. 1, an industrial control system 10 may provide for the control of an industrial process 12. The industrial process 12 may include a set of machines 14, for example, arranged to provide steps in an industrial process fabricating product.

In one nonlimiting example, the machines 14 may be part of a printed circuit board assembly line with a first machine 14a providing for the application of solder paste to a printed circuit board 15, a second machine 14b optically inspecting the printed circuit board and, based on that inspection, removing printed circuit boards for rework as indicated by station 16, with the removed printed circuit boards being either discarded or returned to machine 14a after cleaning. Subsequent machines 14c and 14d may provide a pick and place machine for applying components to the solder paste and a reflow oven for fusing those components to liquefied solder of the solder paste. A final machine 14e may provide for inspection and in-circuit testing of the printed circuit board.

The industrial process 12 may be controlled by an industrial controller 20 of the industrial control system 10, the former receiving data from the industrial process 12 from sensors 22 (e.g., switches, temperature sensors, and the like) associated with different machines 14. Industrial controller 20 may operate according to an industrial control program 26 (often prepared specifically for the particular industrial process 12) and may control data to the industrial process 12 controlling actuators 24 (e.g., motors, solenoids, and the like) controlling the machines 14 according to the industrial control program 20 and the data received from the sensors 22. In this regard the industrial controller 20 may include one or more computer processors communicating with a computer memory (neither shown) holding the stored industrial control program 26.

A printed circuit board 15 moving through the machines 14 may take substantial time (on the order of hours or days or more) before it is completed, and for this reason the printed circuit boards in process represent a substantial investment. Accordingly, it is desired to detect bad printed circuit boards 15 as early as possible prior to the final inspection at machine 14e.

In order to promote early detection of possible manufacturing errors, the industrial control system 10 may include a signature analyzer 28 using a machine-learning engine 30. The signature analyzer 28 receives data from sensors 22' of the industrial process 12 which may be separate or overlap with the sensors 22 used for control. In one example, the sensors 22 may be a machine vision camera sensor 22 associated with machines 14a making detailed measurements of the solder paste deposits on a printed circuit board 15. These measurements may include but are not limited to offsets in X and Y coordinates in the plane of the printed circuit board 15 for each pattern of solder paste, as well as rotation of those patterns and variations in volume, height, and area of the solder paste. These measurements may be repeated for each printed circuit board 15 resulting in a large, constantly evolving sensor data set 32.

Historical values of this sensor data set 32 are collected and used to develop a training set 34 for the machine-learning engine 30, a process that requires associating data sets with outcomes of the manufacture of the printed circuit boards 15 (for example, detected at machine 14e). This training set 34 is then used in a training process program 36 to develop weights used by the machine-learning engine 30 as will be discussed below. The process of training a machine-learning engine 30 with the training set 34 can require substantial effort in creating a clean training set 34 and in characterizing the training set data 34. Accordingly, this process is desirably undertaken only when necessary.

In order to determine whether the machine-learning engine 30 needs retraining, the present invention provides a monitor 40 receiving the current sensor data set 32 as well as the historical training set 34. By comparing the current data from the industrial process 12 with the data that was used for creating the training set 34, the monitor 40 evaluates the need for retraining of the machine-learning engine 30, importantly without an understanding of the internal operation of the machine-learning engine 30 or the need to allow significant errors by the machine-learning engine 30.

In operation, monitor 40 executes a domain analysis program 42 and provides an output 44 indicating at least three categories of operation of the signature analyzer 28, for example, indicating: (1) that the signature analysis is proceeding as expected, or (2) that the signature analysis is beginning to drift but is still acceptable or (3) that retraining is required.

Functional constituent elements of the industrial control system 10 including the industrial controller 20, the signature analyzer 28, and the monitor 40 may be, in one example, efficiently implemented on an industrial control hardware platform 50 allowing the sharing of data, processing resources, and human machine interfaces. Such an industrial control hardware platform 50 may include one or more processors 52 communicating with a computer memory 54 as well as I/O modules 56 communicating with sensors 22 and actuators 24 providing for control of the industrial process 12. The I/O modules 56 may further receive the signature signals from sensors 22', for example, a camera providing machine vision measurement of solder paste on the printed circuit board 15.

During operation, the processor 52 may execute several programs contained in computer memory including the industrial control program 26 for providing for control of the industrial process 12, the program implementing the machine-learning engine 30, and the monitor program 42 for monitoring the machine-learning engine 30. Generally, the hardware platform 50 may include a user interface device 58 such as a computer terminal to allow the outputting of data and receipt of control instructions from and to industrial control program 26, the machine-learning engine 30, and the monitor 40.

Figure 3:
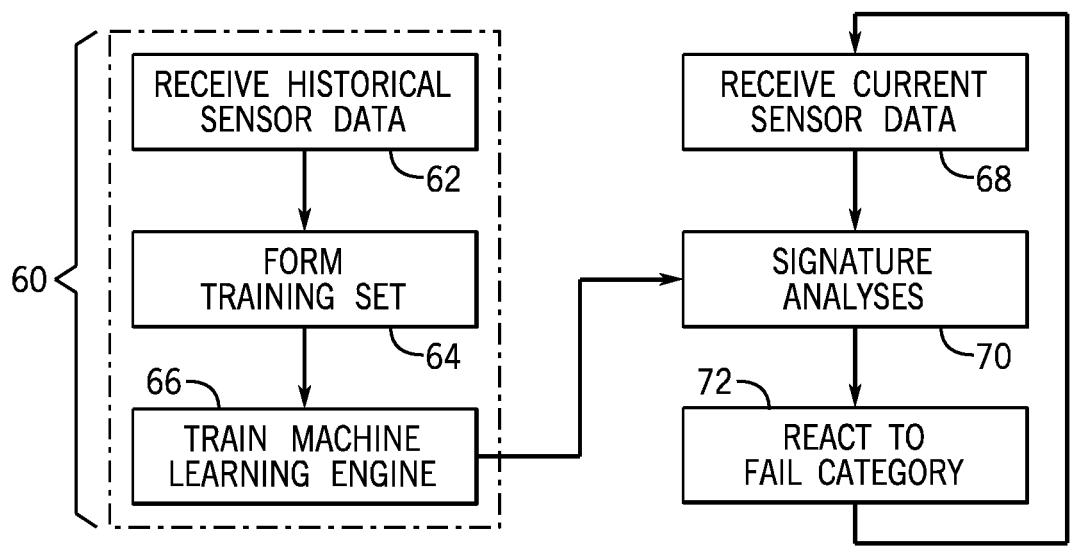
FIG. 3 is a flowchart of a program executable on the hardware of FIG. 2 for training and using the machine-learning engine of the signature analyzer.

Referring now to FIGS. 1 and 3, as is generally understood in the art, prior to use, the machine-learning engine 30 is trained in a series of training steps 60. These training steps 60 may be executed on the hardware platform 50 or off-line and begin with the collection of a set of historical sensor data from the sensor data set 32 together with outcome data, for example, from the machine 14e. These sets of data are assembled into a training set 34 as indicated by process block 64, a process that normally combines multiple substeps of data cleaning (removing outlier or clearly erroneous data), data integration (integrating the data from sensors 22' with the appropriate outcomes measured at machine 14e), and other data manipulation and formatting. The resulting training set 34 is then used per process block 66 to train a set of weights for the machine-learning engine 30, and these weights then are transferred to the machine-learning engine 30 on the industrial controller hardware platform 50.

After the training portion 60 is complete, the signature analyzer 28 may operate during run time as indicated by process blocks 68-72. At process block 62, current data from the sensors 22' is collected and applied as inputs to the machine-learning engine 30 as indicated by process block 70. The machine-learning engine produces an output characterization or classification of the current input data indicating in this example whether a solder paste pattern is acceptable or unacceptable with respect to a prediction as to whether the produced printed circuit board 15 will be functional and within specification. At process block 72, this prediction may be used to cull boards at machine 14b either for reworking or discarding or to invoke corrective maintenance on the machines 14 of the industrial process 12. Generally, this process of process box 68-72 runs concurrently with the execution of the industrial control program 26.

Figure 4:
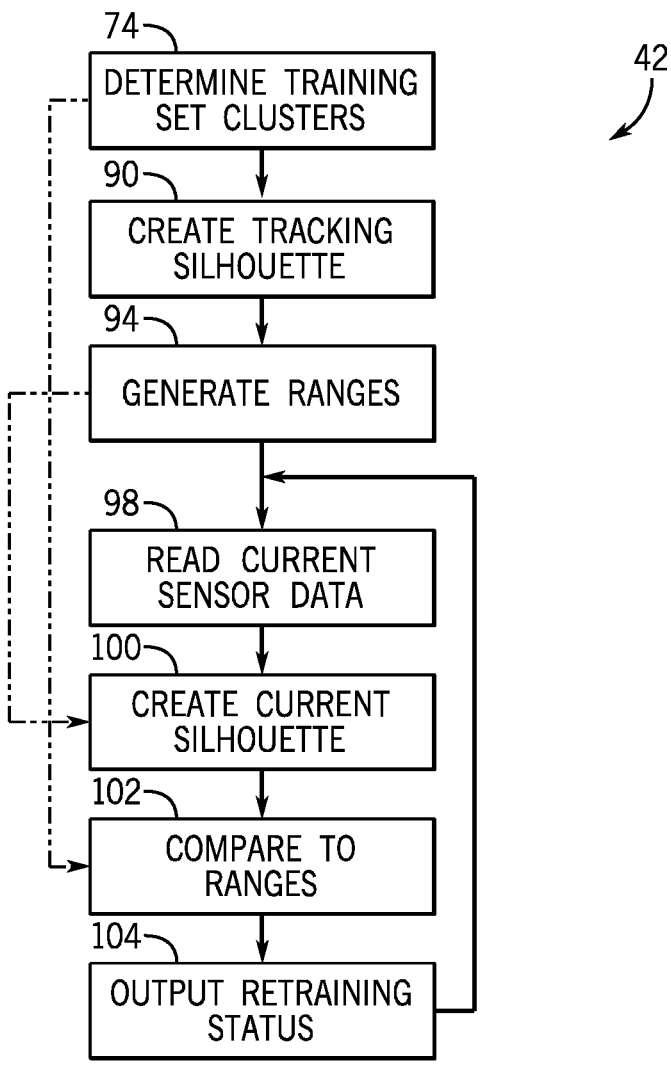
FIG. 4 is a flowchart of a program for monitoring the signature analyzer to detect the need for retraining of the machine-learning engine.

Referring now to FIG. 4, per the present invention, and also concurrent with the operation of the signature analyzer program 30 of process blocks 68-72 and the industrial control program 26, a domain analysis program 42 of the monitor 40 will execute to determine whether the machine-learning engine 30 needs retraining.

As indicated by process block 74, at a first step in program 42 the domain analysis program 42 receives the training set 34 used in the current instance of the machine-learning engine 30 to characterize the domain of this training set 34 statistically. This process may be completed only once for each training of the machine-learning engine 30 per the process blocks of the training portion 60. In a one embodiment, this characterization of the training set 34 provides for a cluster analysis as will be discussed below.

Figure 5:
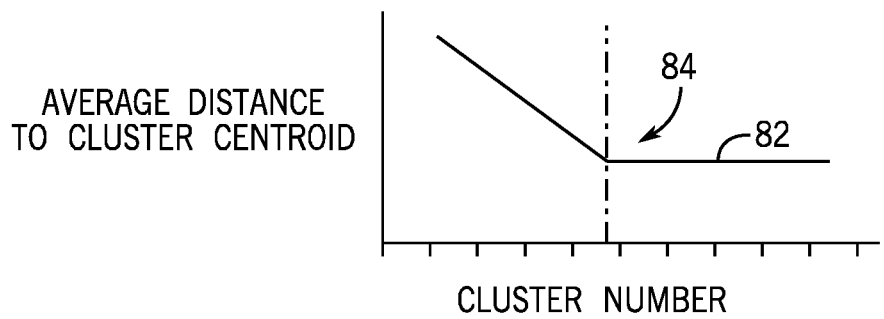
FIG. 5 is a chart showing a method of automatically determining a clustering of the training set data used in the program of FIG. 4.
Figure 6:
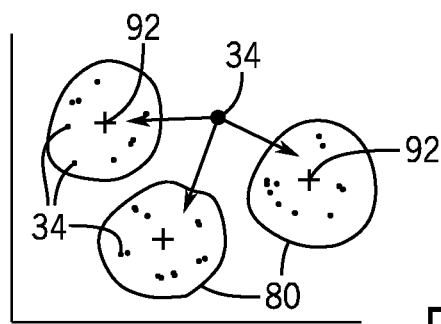
FIG. 6 is a simplified diagrammatic representation of multidimensional clusters formed using the method of FIG. 5 and the determination of a silhouette with respect to those clusters.

Referring now also to FIGS. 5 and 6, in this cluster analysis, the training set 34 is divided into a number (N) of K-mean clusters 80 so that each data point of the training set 34 belongs to a cluster with the nearest mean value. The number N of clusters 80 may be determined by analyzing the average distance-to-cluster-centroid of the data of the training set 34 as a function of cluster number N to produce a scree plot 82 and picking the number N of clusters indicated by a kink 84 in the curve dividing a high rate of change of the curve of the scree plot 82 from a low rate of change of this curve, a technique generally understood in the art.

After generation of the clusters 80 per process block 74 of FIG. 4, per process block 90, the training set 34 is applied to the clusters 80 to deduce a silhouette indicating the effectiveness of the clusters 80 in dividing the data of the training set 34. Creating a silhouette is generally understood in the art of statistical analysis and evaluates each data point of the training set 34 with respect to its distance from the centroids 92 of the different clusters 80. The silhouette values for each data point are averaged to produce a single composite silhouette value for the training set 34.

Figure 7:
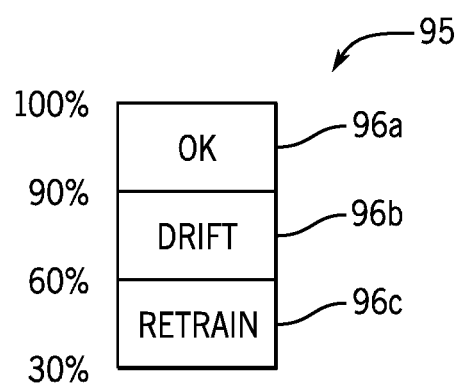
FIG. 7 a diagrammatic representation of silhouette matching ranges determined from the silhouette of the training set and used for indicating a need for retraining.

Referring again to FIG. 4, as indicated by process block 94, the silhouette value deduced from process block 90 is next used establish domain drift ranges 95 as indicated in FIG. 7. In one example, three ranges may be established including: a first range 96a denoting that the machine-learning engine 30 is operating acceptably with respect to the current data from the sensors 22' as determined by its statistical match with the domain of data forming the training set 34; a second range 96b indicating that the current data is no longer highly related to the training set data 34 but that acceptable performance from the machine-learning engine 30 can be assumed; and a retraining range 96c indicating that the machine-learning engine 30 should be retrained as soon as possible. In one embodiment, these ranges may be quantitatively related to the signature deduced at process block 90 so, for example, that range 96a is defined by 90% to 100% of the signature value of the training set 34 whereas range 96b is defined at 60% to 90% of the silhouette value established at process block 90 and range 96c is established at 30% to 60% of the silhouette value established at process block 90. As noted, the steps of process blocks 74, 90, and 94 need be completed only once for each training of the machine-learning model 30.

Referring again to FIG. 4, with these ranges 95 established, a block of current sensor data from the sensors 22' is acquired from the data set 32 as indicated by process block 98. Ideally, the amount of data in this block of data is equal in size to the training set 34. So, for example, if the data of the training set 34 included data points for 1000 printed circuit boards (records), a similar number of records would be collected at process block 98.

At succeeding process block 100, a current silhouette is created for the data of process block 98 using the clusters generated at process block 74. Again, this current silhouette is created by averaging the silhouette values of each data point for the assigned cluster of the data point with respect to other non-assigned clusters from the current data set applied to the clusters 80 of the training set 34.

Figure 2:
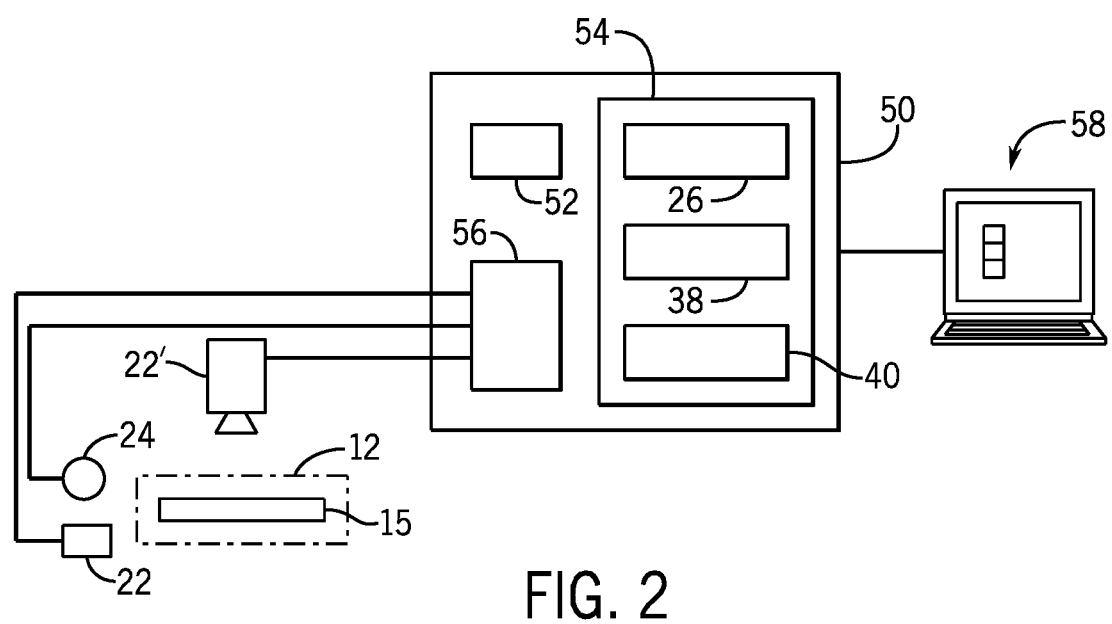
FIG. 2 is a block diagram of hardware for implementing the industrial controller, signature analyzer, and monitor of claim 1.

At process block 102, this current silhouette value is compared to the ranges established at process block 94 to identify one category 96. This category 96 provides output data per process block 104, for example, to a human operator observing the monitor 58 (shown in FIG. 2) indicating whether the machine-learning engine 30 needs to be retrained. If retraining is required, the processes 60 of retraining per FIG. 3 may be repeated. By having this indication of whether retraining is needed, efficient retraining can be done without incurring significant process errors or unnecessary costs in retraining, since the loose-end data (data out of range) has been detected and its known time window provides exactly the data range to be added in the retraining process.

The steps of process box 98, 100, 102, and 104 may be repeated frequently using successive distinct or overlapping sets of current data to provide near real-time assessment of the machine learning engine 30. The cost for such monitoring is low because of its automated nature, much lower cost with respect to attempting retraining models with guessed data ranges at arbitrarily-selected training periods.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed. References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A monitor for a machine-learning process, the monitor comprising:

a set of inputs configured to receive sensor data corresponding to a present operating state of a process;
a memory configured to store a training set and a plurality of instructions, wherein the training set includes data corresponding to a plurality of historical operating states of the process; and
a processor configured to execute the plurality of instructions to:
  develop at least one statistical value corresponding to the present operating state as a function of the sensor data;
  develop at least one training statistical value corresponding to the plurality of historical operating states as a function of the data in the training set;
  compare the at least one statistical value to the at least one training statistical value; and
  generate an indication that retraining of the training set is required when a deviation between the at least one statistical value and the at least one training statistical value exceeds a predefined threshold.

2. The monitor of claim 1, wherein:
the monitor is configured to learn an industrial control process;
the industrial control process is being controlled by an industrial controller; and
the set of inputs to the monitor include at least a portion of a plurality of inputs provided to the industrial controller.

3. The monitor of claim 2, wherein:
the memory for the monitor is a memory for the industrial controller; and
the processor for the monitor is a processor for the industrial controller.

4. The monitor of claim 1, wherein:
the training set includes a plurality of data clusters;
each of the plurality of data clusters has a mean value; and
each value of data in the training set is assigned to one of the plurality of clusters according the mean value for each of the plurality of data clusters closest to the value of the data.

5. The monitor of claim 4, wherein the at least one statistical value describes a domain of the sensor data received and wherein each of the at least one training statistical values corresponds to one of the plurality of data clusters in the training set.

6. The monitor of claim 5, wherein each of the plurality of data clusters measures a statistical distribution of the training set from the mean value and wherein the at least one statistical value measures a matching of the sensor data to the statistical distribution of one of the plurality of data clusters.

7. The monitor of claim 4, wherein the processor is further configured to determine a silhouette for the data in the training set as a function of the plurality of data clusters.

8. The monitor of claim 7, wherein the processor is further configured to determine a first range, a second range, and a third range for the data in the training set as a function of the silhouette, and wherein the first range for the data of the training set indicates the training set is operating as expected, the second range for the data of the training set indicates the training set is drifting from expected operation, and the third range for the data of the training set indicates retraining of the training set is required.

9. The monitor of claim 8, wherein the processor is further configured to generate a second indication that the training set is operating as expected and to generate a third indication that the training set is drifting from expected operation.

10. The monitor of claim 7, wherein the processor is further configured to determine a current silhouette describing a domain of the sensor data received at the set of inputs and wherein the current silhouette is compared to the silhouette for the data in the training set.

11. A method for monitoring a machine-learning process, the method comprising the steps of:
receiving a training set of data, wherein the data in the training set corresponds to a plurality of historical operating states for a process;
developing at least one training statistical value corresponding to the plurality of historical operating states as a function of the data in the training set;
developing at least one statistical value corresponding to a present operating state of the process;
comparing the at least one statistical value to the at least one training statistical value; and
generating an indication that retraining of the training set is required when a deviation between the at least one statistical value and the at least one training statistical value exceeds a predefined threshold.

12. The method of claim 11, wherein:
the training set includes a plurality of data clusters;
each of the plurality of data clusters has a mean value; and
each value of the data in the training set is assigned to one of the plurality of clusters according to the mean value for each of the plurality of data clusters closest to the value of the data.

13. The method of claim 12, wherein the at least one statistical value describes a domain of data received, wherein the data received describes the present operating state of the process and wherein each of the at least one training statistical values corresponds to one of the data clusters in the training set.

14. The method of claim 13, wherein each of the plurality of data clusters measures a statistical distribution of the training set from the mean value and wherein the at least one statistical value measures a matching of the data received to the statistical distribution of one of the plurality of data clusters.

15. The method of claim 12, further comprising the step of determining a silhouette for the data in the training set as a function of the plurality of data clusters.

16. The method of claim 15, further comprising the steps of:
determining a first range for the data in the training set as a function of the silhouette;
determining a second range for the data in the training set as a function of the silhouette; and
determining a third range for the data in the training set as a function of the silhouette, wherein the first range indicates the training set is operating as expected, the second range indicates the training set is drifting from expected operation, and the third range indicates retraining of the training set is required.

17. The method of claim 16, further comprising the steps of:
generating a second indication that the training set is operating as expected; and
generating a third indication that the training set is drifting from expected operation.

18. The method of claim 15 further comprising the step of determining a current silhouette describing a domain of the data received and wherein the current silhouette is compared to the silhouette for the data in the training set.

19. An industrial controller, comprising:
a set of inputs configured to receive sensor data corresponding to a present operating state of a process;
a memory configured to store a training set and a plurality of instructions, wherein the training set includes data corresponding to a plurality of historical operating states of the process; and
a processor configured to execute the plurality of instructions to:
develop at least one statistical value corresponding to the present operating state as a function of the sensor data;
develop at least one training statistical value corresponding to the plurality of historical operating states as a function of the data in the training set;
compare the at least one statistical value to the at least one training statistical value; and
generate an indication that retraining of the training set is required when a deviation between the at least one statistical value and the at least one training statistical value exceeds a predefined threshold.

20. The industrial controller of claim 18, wherein the processor is further configured to determine a current silhouette describing a domain of the sensor data received at the set of inputs and wherein the current silhouette is compared to a silhouette for the data in the training set.

* * * * *